US012520360B2

(12) United States Patent
Shafin et al.

(10) Patent No.: US 12,520,360 B2
(45) Date of Patent: Jan. 6, 2026

(54) METHOD AND APPARATUS FOR TDLS DISCOVERY FOR NSTR CONSTRAINED DEVICES

(71) Applicant: Samsung Electronics Co., Ltd., Suwon-si (KR)

(72) Inventors: Rubayet Shafin, Allen, TX (US); Boon Loong Ng, Plano, TX (US); Peshal Nayak, Plano, TX (US); Vishnu Vardhan Ratnam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 18/356,945

(22) Filed: Jul. 21, 2023

(65) Prior Publication Data

US 2024/0040645 A1    Feb. 1, 2024

Related U.S. Application Data

(60) Provisional application No. 63/394,134, filed on Aug. 1, 2022.

(51) Int. Cl.
*H04W 76/15* (2018.01)
*H04W 40/24* (2009.01)

(52) U.S. Cl.
CPC ......... *H04W 76/15* (2018.02); *H04W 40/246* (2013.01)

(58) Field of Classification Search
None
See application file for complete search history.

(56) References Cited

U.S. PATENT DOCUMENTS 12,369,171 B2 * 7/2025 Lu ................. H04W 8/005
2021/0195540 A1   6/2021 Fischer
(Continued)

FOREIGN PATENT DOCUMENTS

WO   2021178422 A1   9/2021
WO   2022050802 A1   3/2022
(Continued)

OTHER PUBLICATIONS

Extended European Search Report issued Apr. 4, 2025 regarding Application No. 23850369.2, 12 pages.
(Continued)

*Primary Examiner* — Brian S Roberts

(57) ABSTRACT

Methods and apparatuses for facilitating discovery by a multi-link device (MLD) of peer-to-peer (P2P) direct links that overlap with non-simultaneous transmit/receive (NSTR) constrained links of the MLD without violating NSTR constraints. A first non-access point (AP) MLD comprises first stations (STAs), each comprising a transceiver configured to form a link with a corresponding AP of an AP MLD, and a processor. Two of the links form an NSTR link pair. The processor is configured to generate a first message identifying a first NSTR link for establishment of a P2P direct link with a peer STA. The transceiver corresponding to one of the NSTR links is configured to transmit the first message to the AP MLD. The transceiver corresponding to a second NSTR link is configured to wait a predetermined period of time after the first message is transmitted before performing uplink (UL) transmissions to the AP MLD.

20 Claims, 8 Drawing Sheets

(56) References Cited

U.S. PATENT DOCUMENTS

| | | |
|---|---|---|
| 2021/0282186 A1 | 9/2021 | Cherian et al. |
| 2021/0360646 A1 | 11/2021 | Chu et al. |
| 2022/0124857 A1* | 4/2022 | Patil .................. H04W 76/14 |
| 2023/0054755 A1* | 2/2023 | Patil .................. H04W 76/15 |
| 2023/0262768 A1 | 8/2023 | Ko et al. |
| 2023/0284303 A1 | 9/2023 | Ko et al. |
| 2024/0314871 A1* | 9/2024 | Lu .................... H04W 76/15 |

FOREIGN PATENT DOCUMENTS

| | | |
|---|---|---|
| WO | 2022075821 A1 | 4/2022 |
| WO | 2022086952 A1 | 4/2022 |

OTHER PUBLICATIONS

Shafin et al., "Resolution for CIDs in CC36", doc.: IEEE 802.11-22/0254r1, Apr. 2022, 13 pages.

"35. Extremely high throughput (EHT) MAC specification", in IEEE P802.11be/D2.1, Jul. 2022, pp. 403-552.

IEEE P802.11be—D2.1 "Part 11: Wireless LAN Medium Access Control (MAC) and Physical Layer (PHY) Specifications, Amendment 8: Enhancements for extremely high throughput (EHT)" Jul. 2022, 885 pages.

IEEE P802.11be—D3.0 "Part 11: Wireless LAN Medium Access Control (MAC) and Physical Layer (PHY) Specifications—Amendment 8: Enhancements for extremely high throughput (EHT)" Jan. 2023, 999 pages.

IEEE P802.11—REVme™/D2.1; Draft Standard for Information Technology—Telecommunications and Information exchange between Systems Local and Metropolitan Area Networks—Specific Requirements; "Part 11: Wireless LAN Medium Access Control (MAC) and Physical Layer (PHY) Specifications," Jan. 2023, 5803 pages.

International Search Report and Written Opinion issued Oct. 31, 2023 regarding International Application No. PCT/KR2023/011132, 7 pages.

Lu, "Resolution for Miscellaneous CIDs related to Clause 35.3.19 (CC36)", doc.: IEEE 802.11-22/540r7, May 2022, 9 pages.

\* cited by examiner

METHOD AND APPARATUS FOR TDLS DISCOVERY FOR NSTR CONSTRAINED DEVICES

CROSS-REFERENCE TO RELATED APPLICATION AND CLAIM OF PRIORITY

This application claims priority under 35 U.S.C. § 119(e) to U.S. Provisional Patent Application No. 63/394,134 filed on Aug. 1, 2022, which is hereby incorporated by reference in its entirety.

TECHNICAL FIELD

This disclosure relates generally to peer-to-peer (P2P) communication in wireless communications systems that include multi-link devices (MLDs) with non-simultaneous transmit/receive (NSTR) constraints. Embodiments of this disclosure relate to methods and apparatuses for facilitating the discovery of P2P direct links that overlap with NSTR constrained links between peer MLDs in a wireless local area network (WLAN) communications system.

BACKGROUND

WLAN technology allows devices to access the internet in the 2.4 GHz, 5 GHZ, 6 GHz, or 60 GHz frequency bands. WLANs are based on the Institute of Electrical and Electronic Engineers (IEEE) 802.11 standards. The IEEE 802.11 family of standards aims to increase speed and reliability and to extend the operating range of wireless networks.

Next-generation extremely high throughput (EHT) WI-FI systems, e.g., IEEE 802.11be, support multiple bands of operation, called links, over which an access point (AP) and a non-AP device can communicate with each other. Thus both the AP and non-AP device may be capable of communicating on different bands/links, which is referred to as multi-link operation (MLO). The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange are possible on each link that is set up between the AP MLD and non-AP MLD. The component of an MLD that is responsible for transmission and reception on one link is referred to as a station (STA).

Multi-link operation has two variations. The first type is simultaneous transmit/receive (STR) in which the STAs affiliated with the MLD can transmit and receive independent of each other. The second variation is non-simultaneous transmit/receive (NSTR) in which the links formed by the affiliated STAs do not form an STR link pair. If a link pair constitutes an NSTR link pair, transmission on one link can cause interference to the other link due to signal leakiness which the device's radio transceiver is unable to withstand. Consequently, two STAs forming an NSTR link pair cannot simultaneously transmit and receive frames. Since the STR mode of operation requires two or more radios with sufficient isolation, it is expected that AP MLDs will have STR capabilities while non-AP MLDs can potentially be not STR capable.

SUMMARY

Embodiments of the present disclosure provide methods and apparatuses for facilitating discovery by a non-AP MLD of P2P direct links that overlap with NSTR constrained links without violating the NSTR constraints.

In one embodiment, a first non-AP MLD is provided. The first non-AP MLD comprises first STAs, each comprising a transceiver configured to form a link with a corresponding AP of an AP MLD, wherein two of the links form an NSTR link pair subject to NSTR constraints, and a processor operably coupled to the first STAs. The processor is configured to generate a first message identifying a first link of the NSTR link pair as a target link for establishment of a P2P direct link with a peer STA. The transceiver of one of the first STAs corresponding to one of the links of the NSTR link pair is further configured to transmit the first message to the AP MLD. The transceiver of another of the first STAs corresponding to a second link of the NSTR link pair that is not the target link is further configured to wait for a predetermined period of time after the first message is transmitted before performing UL transmissions to the AP MLD.

In another embodiment, a method of wireless communication is provided, performed by a first non-AP MLD that comprises first STAs that each comprise a transceiver configured to form a link with a corresponding AP of an AP MLD such that two of the links form an NSTR link pair subject to NSTR constraints. The method includes the steps of generating a first message identifying a first link of the NSTR link pair as a target link for establishment of a P2P direct link with a peer STA, transmitting the first message to the AP MLD over one of the links of the NSTR link pair, and waiting for a predetermined period of time after the first message is transmitted before performing UL transmissions to the AP MLD over a second link of the NSTR link pair that is not the target link.

In another embodiment, an AP MLD is provided. The AP MLD comprises APs, each comprising a transceiver configured to form a link with a corresponding first STA of a first non-AP MLD, and a processor operably coupled to the APs. Two of the links formed with the first STAs of the first non-AP MLD form an NSTR link pair subject to NSTR constraints. The transceiver of one of the APs is further configured to form a link with a second STA. The transceiver of one of the APs corresponding to one of the links of the NSTR link pair is further configured to receive a first message from the first non-AP MLD. The processor is configured to determine that the first message identifies a first link of the NSTR link pair as a target link for establishment of a P2P direct link with the second STA as a peer STA. The transceiver of another of the APs corresponding to a second link of the NSTR link pair that is not the target link is further configured to wait for a predetermined period of time after the first message is received before soliciting uplink UL transmissions from the non-AP MLD.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block." "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Tunneled direct link setup (TDLS) is a feature of WI-FI that facilitates P2P communication between WI-FI devices. Embodiments of the present disclosure recognize that the TDLS Discovery process defined in the current 802.11be specification is broken for NSTR-constrained non-AP MLDs. For example, when an NSTR non-AP MLD is the TDLS initiator and sends a TDLS Discovery Request, the TDLS responder can send the TDLS Discovery Response over a first link (the direct link) while the NSTR non-AP MLD is transmitting uplink (UL) frames to the AP MLD on a second link, where the first link forms an NSTR link pair with the second link. Accordingly, the NSTR non-AP MLD would not be able to receive the response frame from the TDLS responder due to NSTR constraints.

Accordingly, embodiments of the present disclosure provide methods and apparatuses to facilitate the P2P discovery and setup process for NSTR-constrained MLDs. In particular, embodiments of the present disclosure provide methods and apparatuses to facilitate the TDLS discovery and setup process for NSTR-constrained MLDs.

Figure 1:
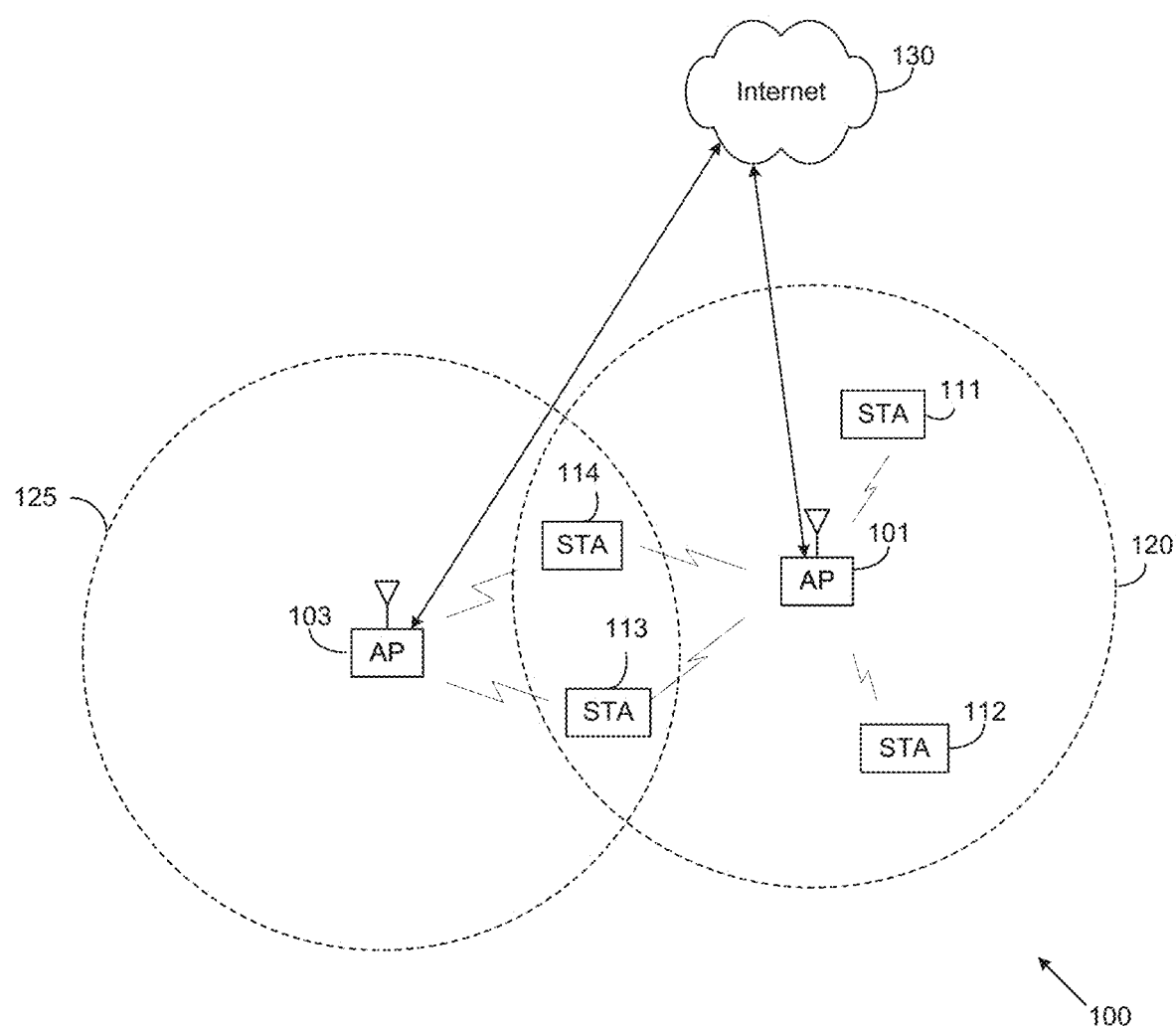
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating discovery by a non-AP MLD of P2P direct links that overlap with NSTR constrained links without violating the NSTR constraints. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
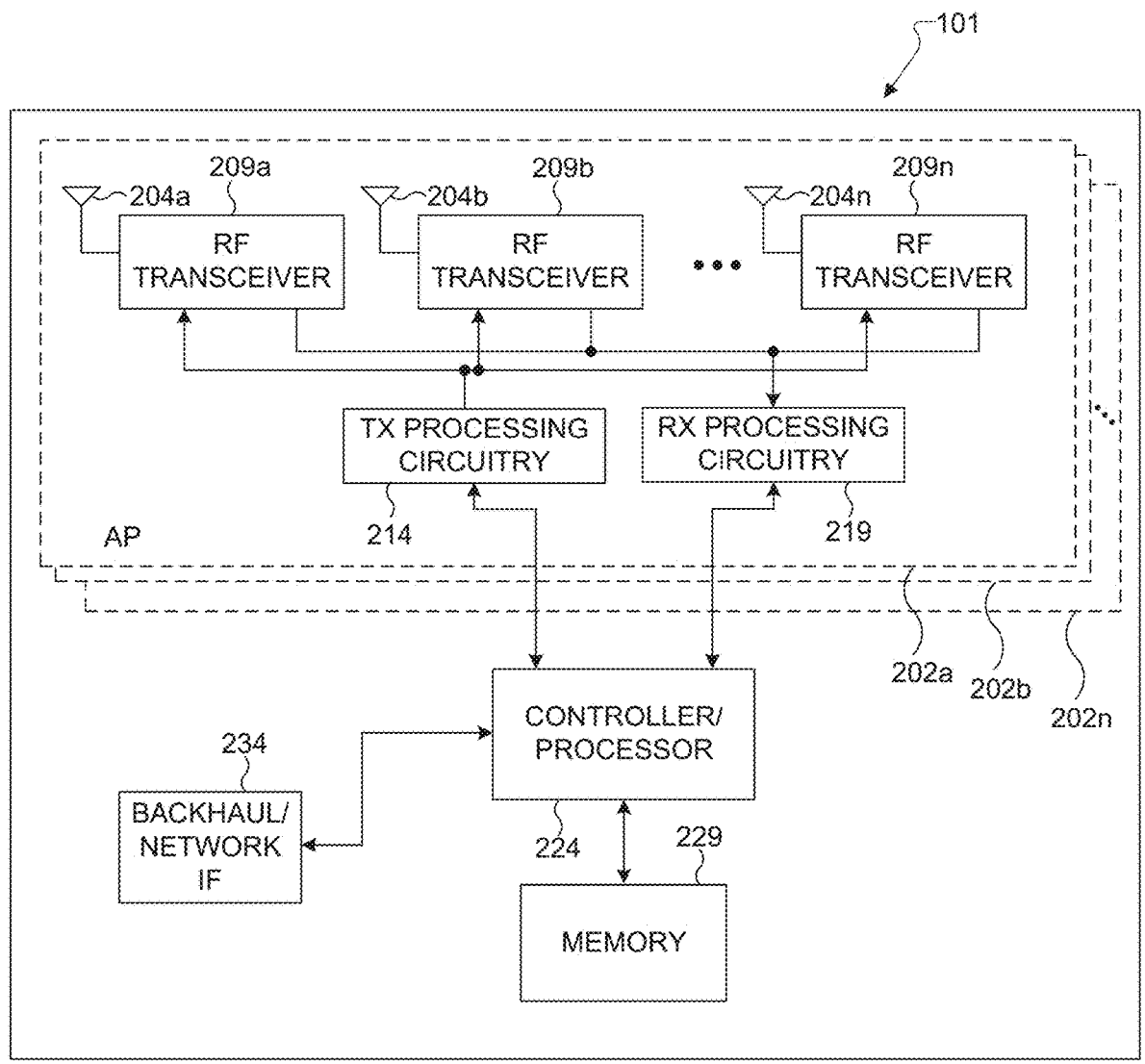
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating discovery by a non-AP MLD of P2P direct links that overlap with NSTR constrained links without violating the NSTR constraints. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating discovery by a non-AP MLD of P2P direct links that overlap with NSTR constrained links without violating the NSTR constraints. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
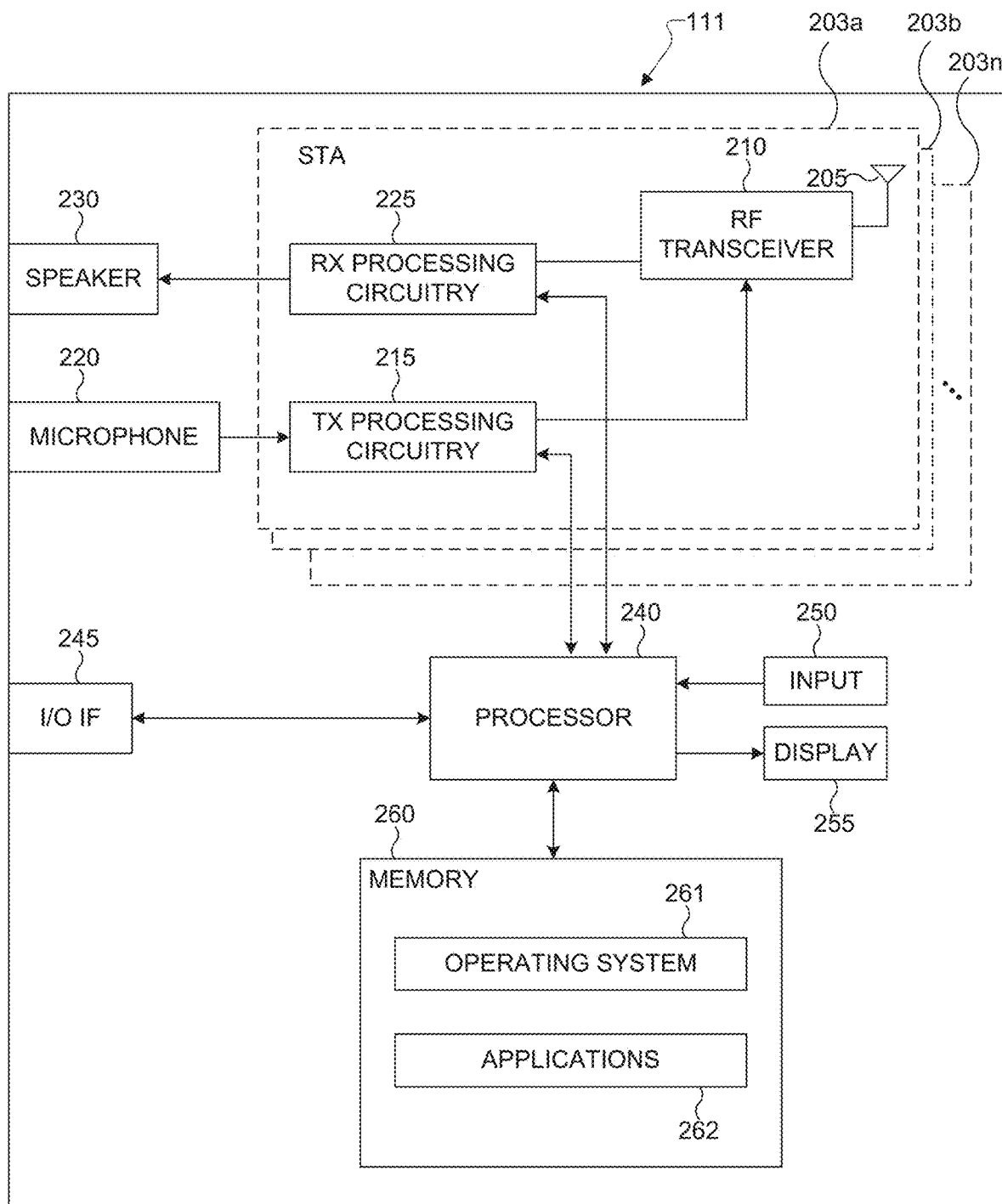
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data)

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHZ, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitating discovery by a non-AP MLD of P2P direct links that overlap with NSTR constrained links without violating the NSTR constraints. In some embodiments, the controller/processor 240 includes at least one microprocessor or microcontroller.

The controller/processor 240 is also capable of executing other processes and programs resident in the memory 260, such as operations for facilitating discovery by a non-AP MLD of P2P direct links that overlap with NSTR constrained links without violating the NSTR constraints. The controller/processor 240 can move data into or out of the memory 260 as required by an executing process. In some embodiments, the controller/processor 240 is configured to execute a plurality of applications 262, such as applications for facilitating discovery by a non-AP MLD of P2P direct links that overlap with NSTR constrained links without violating the NSTR constraints. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Figure 3:
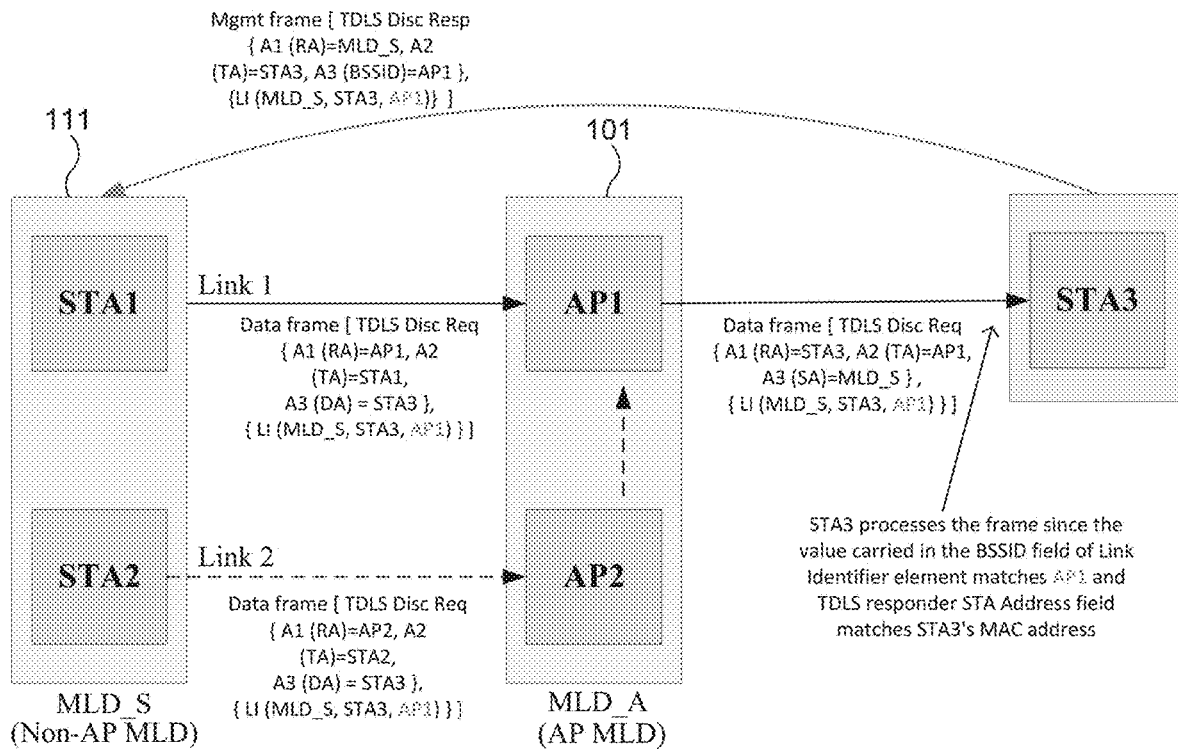
FIGS. 3 and 4 illustrate an example process for discovery of a single TDLS peer STA according to embodiments of the present disclosure.
Figure 4:
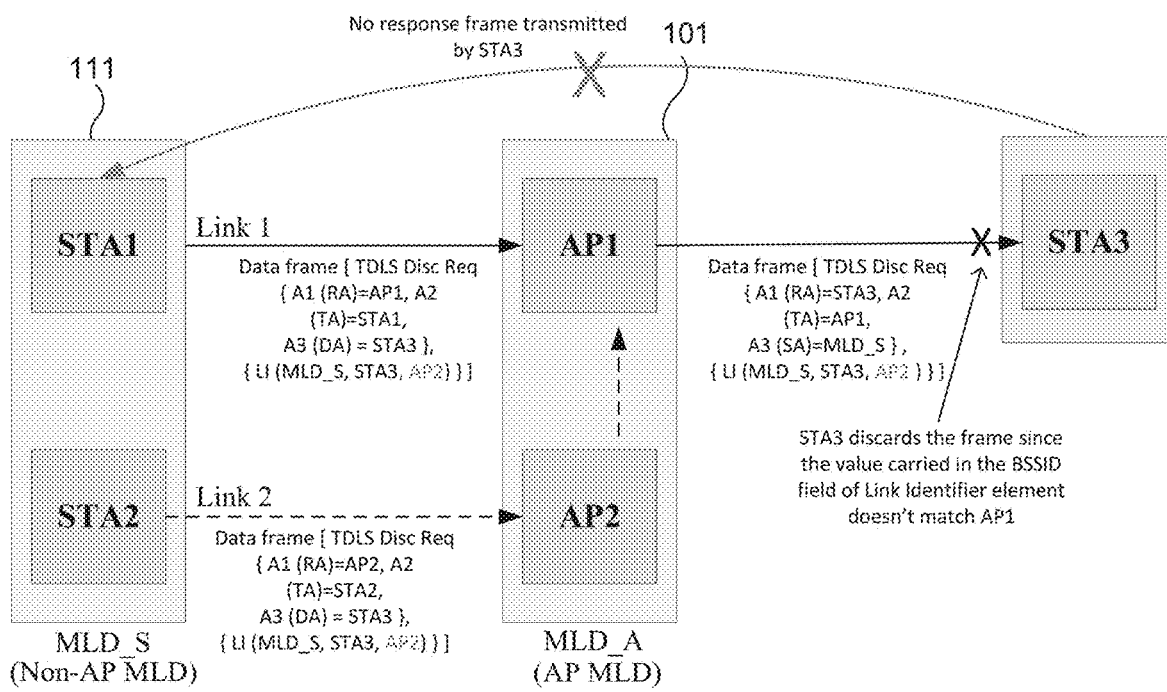

FIGS. 3 and 4 illustrate an example process for discovery of a single tunneled direct link setup (TDLS) peer STA according to embodiments of the present disclosure. In this example, the AP MLD (MLD_A) may be an AP MLD 101, and the non-AP MLD (MLD_S) may be a non-AP MLD 111. Although the AP MLD 101 is illustrated with two affiliated APs (AP1 and AP2) and the non-AP MLD 111 is illustrated as a non-AP MLD with two affiliated non-AP STAs (STA1 and STA2), it is understood that this process could be applied with suitable MLDs having any number of affiliated APs or STAs. For ease of explanation, it is understood that references to an AP MLD and a non-AP MLD in further embodiments below refer to the AP MLD 101 and non-AP MLD 111, respectively.

FIGS. 3 and 4 illustrate the scenario in which the TDLS discovery is initiated by a non-AP MLD (MLD_S). MLD_S has performed multi-link setup with an AP MLD (MLD_A). As noted above, MLD_S has two affiliated STAs—STA1 and STA2. STA3 is not capable of performing multi-link operation and is not affiliated with a non-AP MLD. MLD A has two affiliated APs—AP1 and AP2—where AP1 operates on link 1 and AP2 operates on link 2. STA1 and STA3 operate on link 1 and are associated with AP1. STA2 operates on link 2 and is associated with AP2.

In the example, MLD_S initiates TDLS discovery by transmitting two TDLS Discovery Request frames (which are Data frames), as it does not know which link STA3 is operating on and whether STA3 is affiliated with an MLD or is a STA not affiliated with an MLD. The first TDLS Discovery Request frame, illustrated in FIG. 3, has the BSSID field in the Link Identifier element set to the BSSID (basic service set identifier) of AP1 and the second TDLS Discovery Request frame, illustrated in FIG. 4, has this field set to the BSSID of AP2. Both the frames have their A3 (DA) set to the STA3 MAC address and the To DS subfield of the Frame Control field set to 1.

The TDLS Discovery Request frame can be transmitted over either link 1 (through STA1 as represented by a solid line) or link 2 (through STA2 as represented by a dotted line). When the TDLS Discovery Request frame is received at the AP MLD (i.e., through AP1 or AP2), it routes the frame to STA3 through AP1 by setting the From DS subfield of the Frame Control field to 1 and A3 (SA) to the non-AP MLD Address (i.e., MLD_S).

STA3 discards the TDLS Discovery Request frame that had the BSSID field of its Link Identifier element set to the BSSID of AP2, as it does not recognize the BSSID. STA3 recognizes the BSSID set to AP1 and responds with a TDLS Discovery Response frame, which is a Management frame, with the RA set to the MLD_S and both the To DS and From DS subfields set to 0. The TDLS STA affiliated with MLD_S receives the TDLS Discovery Response frame, which is sent on the TDLS direct link. The TDLS initiator STA Address field and the TDLS responder STA Address field contained in the Link Identifier element (denoted as LI in the figure) are carried in the TDLS Discovery Request frame and in the TDLS Discovery Response frame and are set to MLD_S and STA3, respectively.

Data transmission rules for an NSTR non-AP MLD, where STAs affiliated with the non-AP MLD form one or more NSTR link pairs, are defined in 802.11be standards. According to current specifications, for physical layer protocol data unit (PPDU) transmission on a link that forms an NSTR link pair with another STA affiliated with the same non-AP MLD, the end time of the PPDUs transmitted on those links need to be aligned in order to prevent self-interference at the non-AP MLD side due to NSTR constraints.

Figure 5:
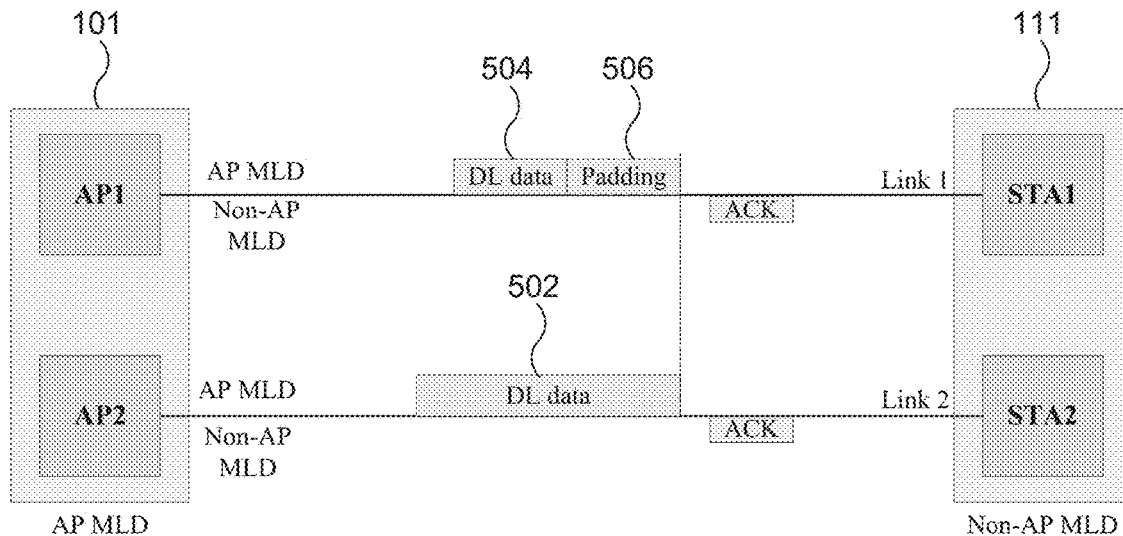
FIG. 5 illustrates an example of PPDU end time alignment on an NSTR link according to embodiments of the present disclosure.

FIG. 5 illustrates an example of PPDU end time alignment on an NSTR link according to embodiments of the present disclosure. In this example, AP1 and AP2 are two APs affiliated with the AP MLD 101. Also, STA1 and STA2 are two non-AP STAs affiliated with the non-AP MLD 111. Two links are set up between the AP MLD and the non-AP MLD-Link 1 between AP1 and STA1, and Link 2 between AP2 and STA2. The non-AP MLD is an NSTR non-AP MLD, i.e., Link 1 and Link 2 form an NSTR link pair. Moreover, both Link 1 and Link 2 are enabled links.

In the example of FIG. 5, AP2 transmits a DL PPDU 502 for STA2 on Link 2. Shortly thereafter, AP1 transmits a DL PPDU 504 to STA1 on Link 1. The DL PPDU 504 transmission on Link 1 finishes earlier than the end time of the DL PPDU 502 transmitted on Link 2. In this situation, in order to avoid self-interference at the non-AP MLD, according to the current 802.11be specification, AP1 will align the end time of DL PPDU 504 on Link 1 with the end time of the DL PPDU 502 on Link 2. In this example, the alignment is performed by appending extra padding bits 506 within the DL PPDU 504 transmitted on Link 1.

As discussed above, embodiments of the present disclosure provide methods and apparatuses to facilitate the TDLS discovery and setup process for NSTR-constrained non-AP MLDs. According to one embodiment, when an NSTR non-AP MLD intends to discover a TDLS peer STA on any of its links (say, on the first link) that is part of an NSTR link pair (say, with a second link), the non-AP MLD, after sending the TDLS Discovery Request frame on the first link, can wait for a threshold amount of time (or a predetermined period of time) before the non-AP MLD starts transmission on the second link. This threshold amount of time can be referred to as the TDLS Discovery Response Wait Time. This threshold amount of time can be equal to the value indicated in the dot11TDLSResponseTimeout management information base (MIB) variable. According to one embodiment, if the threshold amount of time has elapsed and the non-AP MLD doesn't receive a TDLS Discovery Response frame in response to the transmitted TDLS Discovery Request frame, then the non-AP MLD can terminate the current TDLS discovery process on that link.

Figure 6:
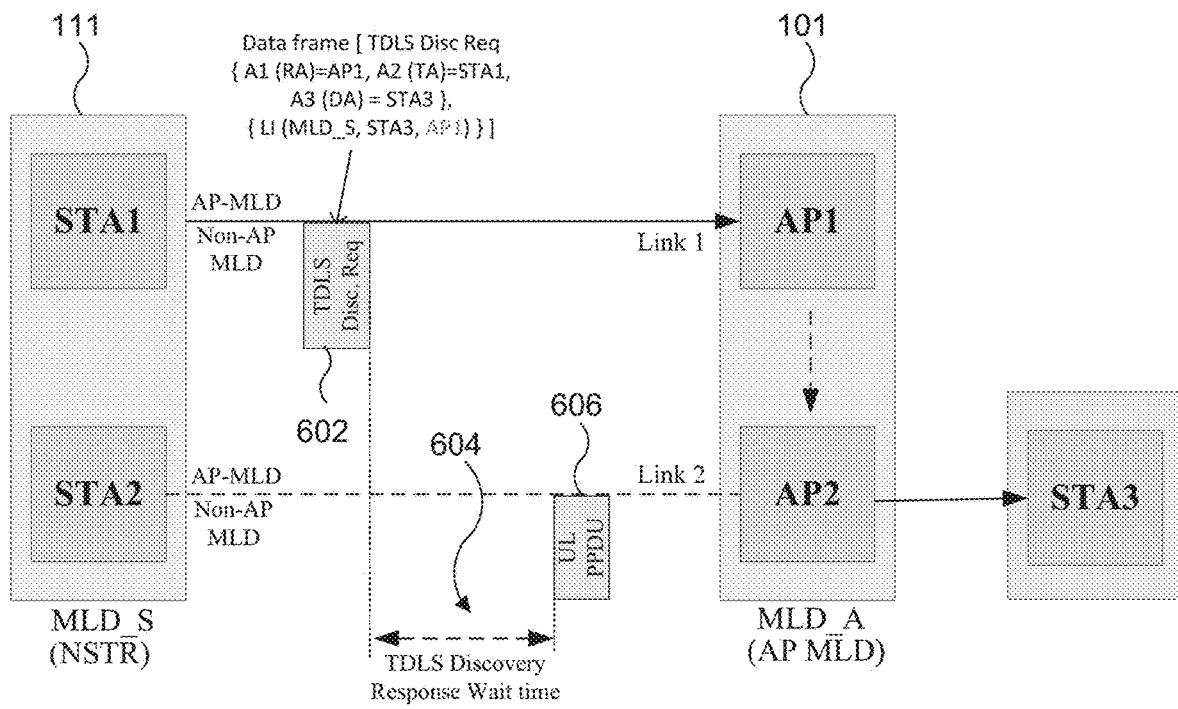
FIG. 6 illustrates an example system utilizing a TDLS Discovery Response Wait Time according to embodiments of the present disclosure.

FIG. 6 illustrates an example system utilizing a TDLS Discovery Response Wait Time according to embodiments of the present disclosure. In FIG. 6, TDLS discovery is initiated by a non-AP MLD (MLD_S). MLD_S has performed multi-link setup with an AP MLD (MLD_A). MLD_S has two affiliated STAs—STA1 and STA2. MLD A has two affiliated APs—AP1 and AP2—where AP1 operates on link 1 and AP2 operates on link 2. STA1 operates on link 1 and is associated with AP1. STA2 and STA3 operate on link 2 and are associated with AP2. Link 1 and link 2 form an NSTR link pair at MLD_S.

In this example, MLD_S intends to discover a TDLS peer STA on link 1 and initiates TDLS discovery by transmitting a TDLS Discovery Request frame 602 (which is a Data frame) on link 1—this may be referred to as a same-link discovery. The TDLS Discovery Request frame 602 has the BSSID field in the Link Identifier element set to the BSSID of AP1, the A3 (DA) set to the STA3 MAC address, and the To DS subfield of the Frame Control field set to 1.

When the TDLS Discovery Request frame 602 is received at the AP MLD (i.e., through AP1), it routes the frame to STA3 through AP2 by setting the From DS subfield of the Frame Control field to 1 and A3 (SA) to the non-AP MLD Address (i.e., MLD_S). In this example, STA3 discards the TDLS Discovery Request frame 602, which has the BSSID field of its Link Identifier element set to the BSSID of AP1, as it does not recognize the BSSID. Accordingly, STA3 never sends a TDLS Discovery Response frame.

In this example, after sending the TDLS Discovery Request frame 602 on link 1, MLD_S waits for a period of time that corresponds to the TDLS Discovery Response Wait Time 604 before performing any UL transmissions on link 2 (i.e., transmissions from STA2 to AP2). Accordingly, STA1 would be available to receive a TDLS Discovery Response frame transmitted by STA3 on a TDLS direct link established over link 1.

As discussed above, however, since STA3 is not associated with AP1 on link 1 it does not send any TDLS Discovery Response frame in response to the TDLS Discovery Request frame 602. As a result, the TDLS Discovery Response Wait Time 604 elapses. Afterwards, MLD_S resumes UL transmissions on link 2, and STA2 transmits a UL PPDU 606 to AP2 over link 2. In some embodiments, MLD_S may terminate the TDLS discovery process on link 1 when the TDLS Discovery Response Wait Time 604 elapses without receipt of a TDLS Discovery Response frame.

According to another embodiment, upon sending a TDLS Discovery Request frame on a first link of an NSTR link pair for discovery of a TDLS peer STA on the first link, the non-AP MLD can start transmission on a second link of the NSTR link pair either after elapse of the TDLS Discovery Response Wait Time duration or after reception of a TDLS Discovery Response frame by the STA affiliated with the non-AP MLD and operating on the first link in response of the TDLS Discovery Request frame sent by the STA, whichever event happens first.

Figure 7:
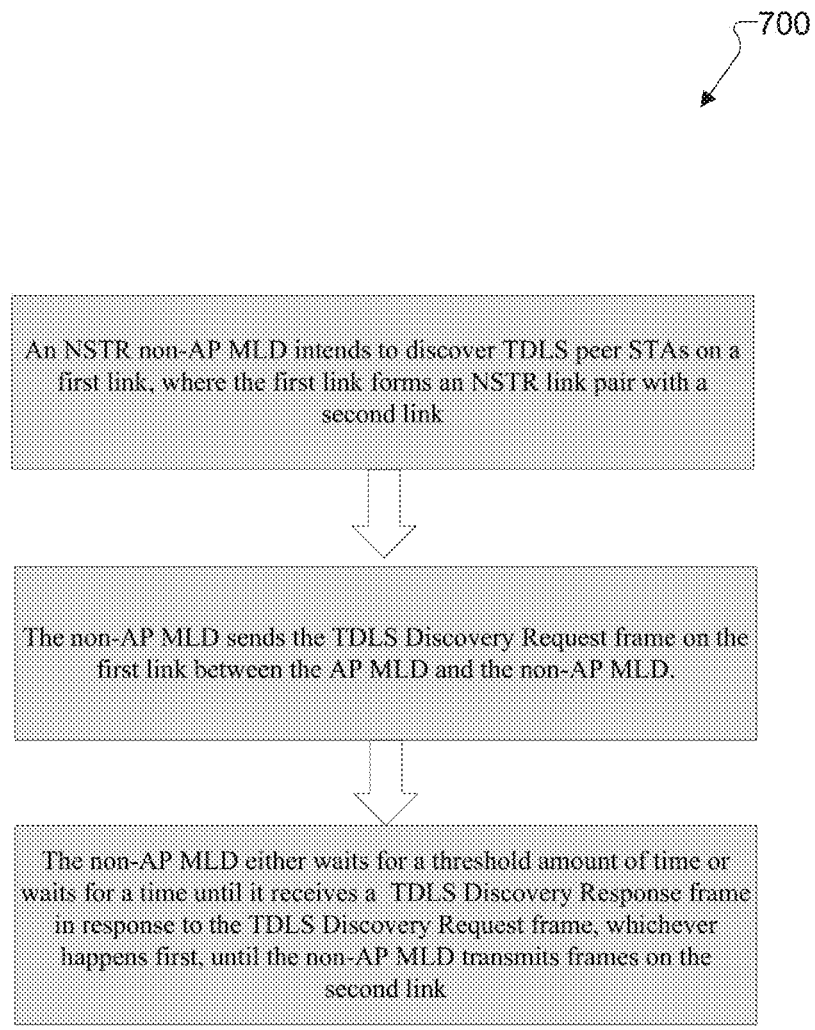
FIG. 7 illustrates an example of a TDLS discovery process conducted on an NSTR link by an NSTR non-AP MLD according to embodiments of the present disclosure.

FIG. 7 illustrates an example of a TDLS discovery process 700 conducted on an NSTR link by an NSTR non-AP MLD according to embodiments of the present disclosure. In this example, the TDLS discovery process 700 is a same-link discovery, but it is understood that a similar process could be used for a cross-link discovery, discussed herein below.

According to another embodiment, an NSTR non-AP MLD may intend to discover a TDLS peer STA on any of its links (say, on the second link) that is part of an NSTR link pair (say, with the first link) using a TDLS Discovery Request frame sent on the other link of the NSTR link pair (i.e., the first link)—this may be referred to as cross-link discovery. The non-AP MLD, after sending the TDLS Discovery Request frame on the first link for discovering a TDLS peer STA on the second link (i.e., in the Link Identifier of the TDLS Discovery Request frame, the AP address (the BSSID subfield of the Link Identifier element) is set as the AP affiliated with the AP MLD with which the non-AP MLD is associated and operating on the second link), can wait for a threshold amount of time before the non-AP MLD starts any UL transmission on the first link. Similar to the same-link discovery scenario, this threshold amount of time can be indicated as the time duration indicated in the TDLS Discovery Response Wait Time.

According to another embodiment, after sending the TDLS Discovery Request frame on the first link for discovering a TDLS peer STA on the second link, the non-AP MLD can start UL transmission on the first link either after elapse of the TDLS Discovery Response Wait Time duration or after reception of a TDLS Discovery Response frame by the STA affiliated with the non-AP MLD and operating on the second link in response to the TDLS Discovery Request frame sent on the first link, whichever event happens first.

Figure 8A:
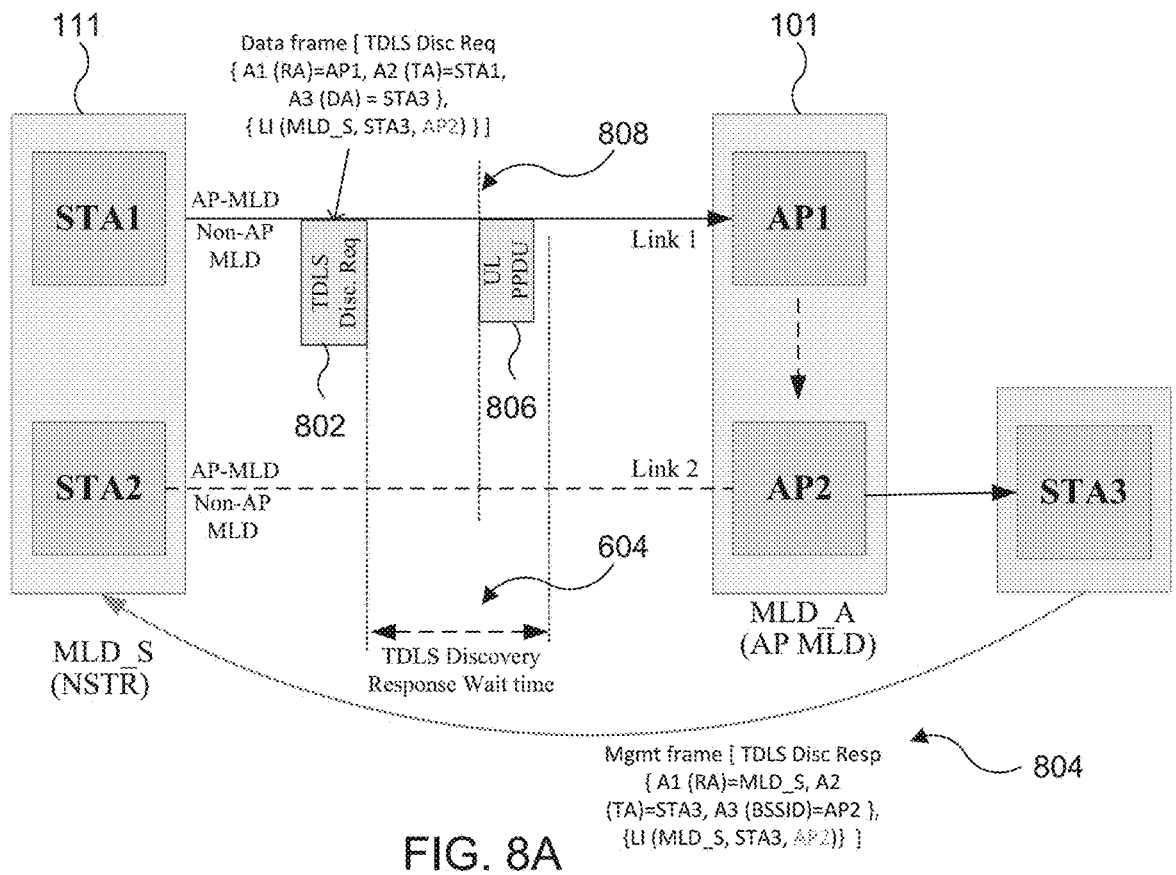
FIGS. 8A and 8B illustrate example systems utilizing a TDLS Discovery Response Wait Time for cross-link discovery according to embodiments of the present disclosure.
Figure 8B:
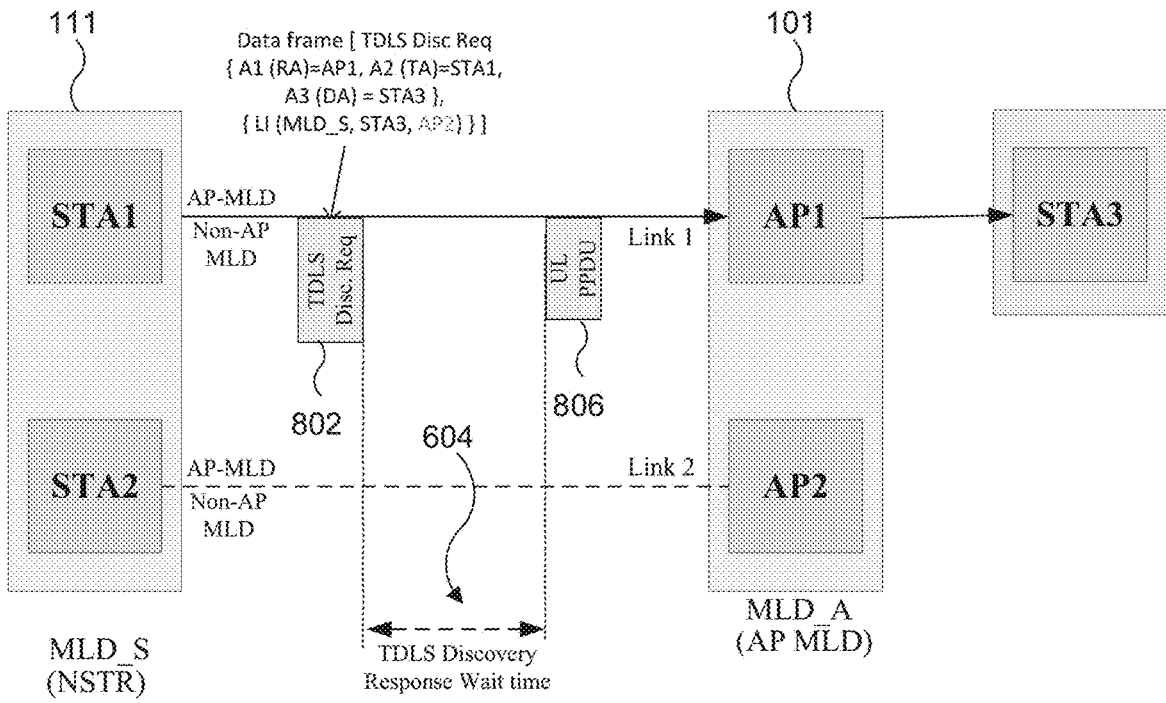

FIGS. 8A and 8B illustrate example systems utilizing a TDLS Discovery Response Wait Time for cross-link discovery according to embodiments of the present disclosure. The system of FIG. 8A is similar to the system of FIG. 6, but in the example of FIG. 8A MLD_S intends to discover a TDLS peer STA on link 2 by transmitting a TDLS Discovery Request frame 802 on link 1—i.e., this example is a cross-link discovery. Accordingly, the TDLS Discovery Request frame 802 has the BSSID field in the Link Identifier element set to the BSSID of AP2, the A3 (DA) set to the STA3 MAC address.

When the TDLS Discovery Request frame 802 is received at the AP MLD (i.e., through AP1), it routes the frame to STA3 through AP2 by setting the From DS subfield of the Frame Control field to 1 and A3 (SA) to the non-AP MLD Address (i.e., MLD_S). In this example, after sending the TDLS Discovery Request frame 802 on link 1, MLD_S waits for a period of time that corresponds to the TDLS Discovery Response Wait Time 604 before performing any UL transmissions on link 1 (i.e., transmissions from STA1 to AP1). Accordingly, STA2 will be available to receive the TDLS Discovery Response frame 804 transmitted by STA3 on the TDLS direct link established over link 2.

In this example, STA3 recognizes the BSSID set to AP2 and responds with a TDLS Discovery Response frame 804 (which is a Management frame) with the RA set to MLD_S and both To DS and From DS subfields set to 0. The TDLS peer STA affiliated with MLD_S (i.e., STA2) receives the TDLS Discovery Response frame 804, which is sent on the TDLS direct link (which is also link 2). The TDLS initiator STA Address field and the TDLS responder STA Address field contained in the Link Identifier element (denoted as LI in the figure) are carried in the TDLS Discovery Request frame 802 and in the TDLS Discovery Response frame 804 and are set to MLD_S and STA3, respectively.

In this example, MLD_S has completed receiving the TDLS Discovery Response frame 804 at time 808. MLD_S may resume UL transmission on link 1 at time 808 even though the TDLS Discovery Response Wait Time 604 has not elapsed.

The system of FIG. 8B is similar to the system of FIG. 8A, except that STA3 operates on link 1 and is associated with AP1. In this example, STA3 discards the TDLS Discovery Request frame 802, which has the BSSID field of its Link Identifier element set to the BSSID of AP2, as it does not recognize the BSSID. Accordingly, STA3 never sends a TDLS Discovery Response frame.

After sending the TDLS Discovery Request frame 802 on link 1, MLD_S waits for a period of time that corresponds to the TDLS Discovery Response Wait Time 604 before performing any UL transmissions on link 1 (i.e., transmissions from STA1 to AP1). Accordingly, STA2 would be available to receive the TDLS Discovery Response frame transmitted by STA3 on a TDLS direct link established over link 2, however, as discussed above STA3 does not send any TDLS Discovery Response frame in response to the TDLS Discovery Request frame 802. As a result, the TDLS Discovery Response Wait Time 604 elapses. Afterwards, MLD_S resumes UL transmissions on link 1, and STA1 transmits a UL PPDU 806 to AP1 over link 1. In some embodiments, MLD_S may terminate the TDLS discovery process on link 2 when the TDLS Discovery Response Wait Time 604 elapses without receipt of a TDLS Discovery Response frame.

According to one embodiment, when an AP MLD receives a TDLS Discovery Request frame from an associated NSTR non-AP MLD over a first link between the AP MLD and the non-AP MLD for discovering TDLS peer STAs on the first link between the AP MLD and the non-AP MLD (i.e., in the Link Identifier element of the TDLS Discovery Request frame, the AP address—i.e., the BSSID subfield of the Link Identifier element—is set as the AP affiliated with the AP MLD and operating on the first link), if a second link between the same AP MLD and the non-AP MLD forms an NSTR link pair at the non-AP MLD (that is, in a same-link discovery scenario), then the AP MLD may not solicit frame transmission from the non-AP MLD on the second link (or the AP MLD may not transmit a frame to the non-AP MLD on the second link that solicits an immediate response from the non-AP MLD) until a threshold amount of time indicated by the TDLS Discovery Response Wait Time has elapsed after reception of the TDLS Discovery Request frame by the AP MLD.

According to another embodiment of the same-link discovery scenario, the non-AP MLD, upon reception of a TDLS Discovery Response frame over a TDLS direct link (that corresponds to the first link) in response to the TDLS Discovery Request frame, can transmit a notification frame to the AP MLD that notifies the AP MLD that the non-AP MLD has received the corresponding TDLS Discovery Response frame. Accordingly, the AP MLD, if it intends to, can start transmitting PPDUs to the non-AP MLD on the second link that solicit immediate response from the non-AP MLD—even if the threshold amount of time indicated by the TDLS Discovery Response Wait Time has not elapsed after reception of the TDLS Discovery Request frame by the AP MLD.

According to one embodiment, when an AP MLD receives a TDLS Discovery Request frame from an associated NSTR non-AP MLD over a first link between the AP MLD and the non-AP MLD for discovering TDLS peer STAs on a second link between the same AP MLD and the non-AP MLD (i.e., in the Link Identifier element of the TDLS Discovery Request frame, the AP address—i.e., the BSSID subfield of the Link Identifier element—is set as the AP affiliated with the AP MLD that is operating on the second link), where the first link and the second link form an NSTR link pair at the non-AP MLD (that is, in a cross-link discovery scenario), the AP MLD may not solicit frame transmission from the non-AP MLD on the first link (or the AP MLD may not transmit a frame to the non-AP MLD on the first link that solicits an immediate response from the non-AP MLD) until a threshold amount of time indicated by the TDLS Discovery Response Wait Time has elapsed after reception of the TDLS Discovery Request frame by the AP MLD.

According to another embodiment of the cross-link discovery scenario, the non-AP MLD, upon reception of a TDLS Discovery Response frame over the TDLS direct link (that corresponds to the second link) in response to the TDLS Discovery Request frame, can transmit a notification frame to the AP MLD that notifies the AP MLD that the non-AP MLD has received the corresponding TDLS Discovery Response frame. Accordingly, the AP MLD, if it intends to, can start transmitting PPDUs to the non-AP MLD on the first link that solicit immediate response from the non-AP MLD—even if the threshold amount of time indicated by the TDLS Discovery Response Wait Time has not elapsed after reception of the TDLS Discovery Request frame by the AP MLD.

Figure 9:
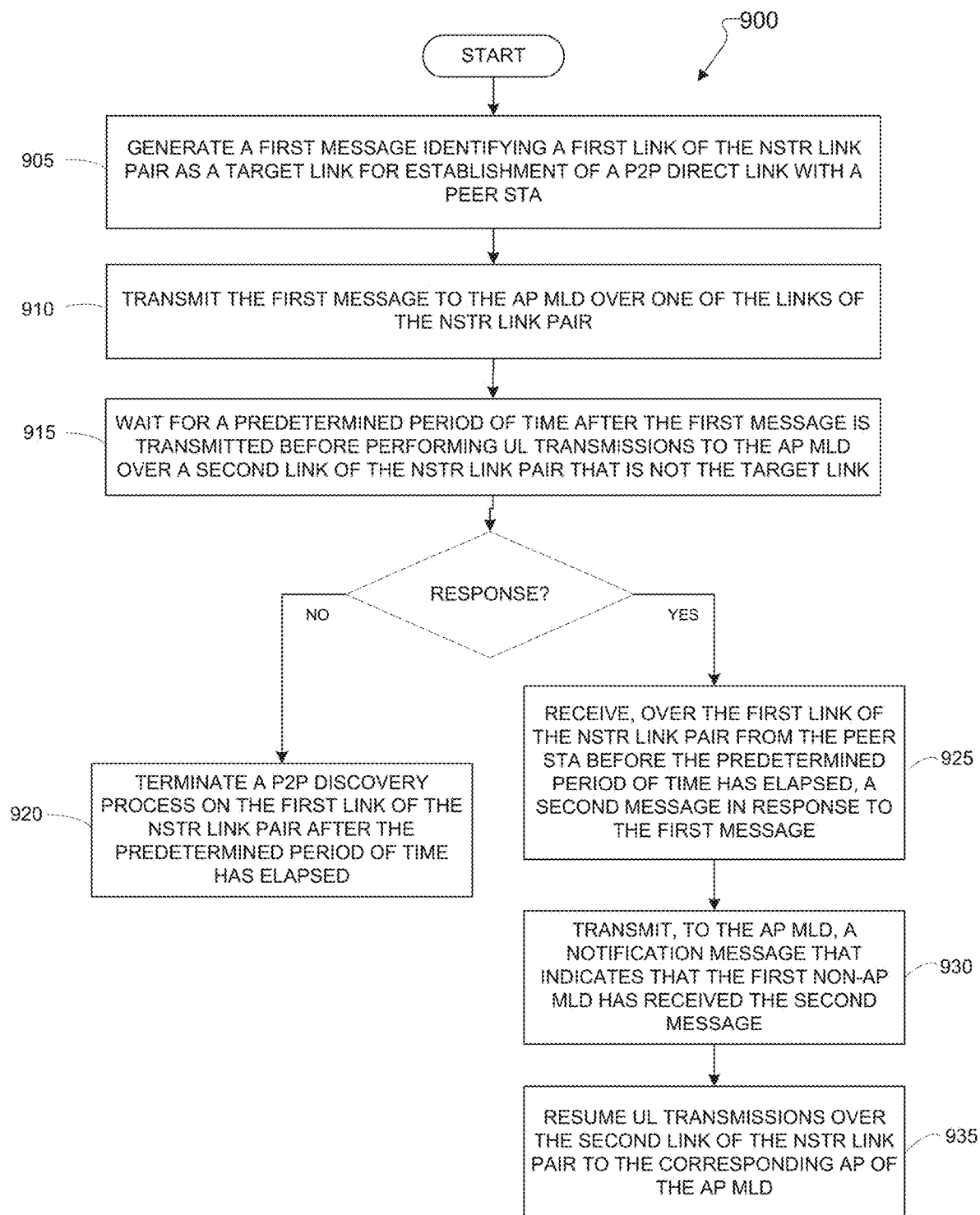
FIG. 9 illustrates an example process for facilitating discovery by a non-AP MLD of P2P direct links that overlap with NSTR constrained links without violating the NSTR constraints according to embodiments of the present disclosure.

FIG. 9 illustrates an example process 900 for facilitating discovery by a non-AP MLD of P2P direct links that overlap with NSTR constrained links without violating the NSTR constraints according to embodiments of the present disclosure. The process 900 is discussed as being performed by a first non-AP MLD, but it is understood that a corresponding AP MLD performs a corresponding process. Additionally, for convenience the process 900 is discussed as being performed by a WI-FI non-AP MLD comprising first STAs that each comprise a transceiver configured to form a link with a corresponding AP affiliated with a WI-FI AP MLD, where two of the links form an NSTR link pair subject to NSTR constraints. However, it is understood that any suitable wireless communication device could perform these processes.

Referring to FIG. 9, the process 900 begins with the first non-AP MLD generating a first message identifying a first link of the NSTR link pair as a target link for establishment of a P2P direct link (e.g., a TDLS direct link) with a peer STA (step 905).

Next, the first non-AP MLD transmits the first message to the AP MLD over one of the links of the NSTR link pair (step 910). That is, the first non-AP MLD transmits the first message via one of the first STAs that forms the NSTR links with a corresponding one of the APs of the AP MLD.

The first non-AP MLD then waits for a predetermined period of time after the first message is transmitted before performing UL transmissions to the AP MLD over a second link of the NSTR link pair that is not the target link (step 915). The predetermined period of time may be, e.g., a TDLS Discovery Response Wait time, and may be defined as a value in an MIB variable.

If the first non-AP MLD does not receive a response to the first message before the predetermined period of time has elapsed, then at step 920 the first non-AP MLD terminates the P2P discovery process on the first link of the NSTR link pair.

Alternatively, the first non-AP MLD receives, over the first link of the NSTR link pair from the peer STA before the predetermined period of time has elapsed, a second message in response to the first message (step 925).

In this case, the first non-AP MLD then transmits, to the AP MLD, a notification message that indicates that the first non-AP MLD has received the second message (step 930). Additionally, the first non-AP MLD resumes UL transmissions over the second link of the NSTR link pair to the corresponding AP of the AP MLD after the second message is received (step 935).

In some embodiments, the first non-AP MLD transmits the first message over the first NSTR link (for same-link discovery). In other embodiments, the first non-AP MLD transmits the first message over the second NSTR link (for cross-link discovery).

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A first non-access point (AP) multi-link device (MLD), comprising:
   first stations (STAs) each comprising a transceiver configured to form a link with a corresponding AP of an AP MLD, wherein two of the links form a non-simultaneous transmit/receive (NSTR) link pair subject to NSTR constraints; and
   a processor operably coupled to the first STAs, the processor configured to generate a first message identifying a first link of the NSTR link pair as a target link for establishment of a peer-to-peer (P2P) direct link with a peer STA,
   wherein the transceiver of one of the first STAs corresponding to one of the links of the NSTR link pair is further configured to transmit the first message to the AP MLD, and
   wherein the transceiver of another of the first STAs corresponding to a second link of the NSTR link pair that is not the target link is further configured to wait for a predetermined period of time after the first message is transmitted before performing uplink (UL) transmissions to the AP MLD.

2. The first non-AP MLD of claim 1, wherein:
   the transceiver of the first STA corresponding to the first link of the NSTR link pair is further configured to receive, from the peer STA before the predetermined period of time has elapsed, a second message in response to the first message; and
   the transceiver of the first STA corresponding to the second link of the NSTR link pair is further configured to resume performing UL transmissions to the AP MLD after the second message is received.

3. The first non-AP MLD of claim 2, wherein the first message is transmitted over the first link of the NSTR link pair.

4. The first non-AP MLD of claim 2, wherein the first message is transmitted over the second link of the NSTR link pair.

5. The first non-AP MLD of claim 2, wherein:
   the transceiver of the first STA corresponding to the first link of the NSTR link pair is further configured to receive, from the peer STA before the predetermined period of time has elapsed, a second message in response to the first message; and
   the transceiver of one of the first STAs is further configured to transmit, to the AP MLD, a notification message that indicates that the first non-AP MLD has received the second message.

6. The first non-AP MLD of claim 1, wherein the processor is further configured to terminate a P2P discovery process on the first link of the NSTR link pair after the predetermined period of time has elapsed.

7. The first non-AP MLD of claim 1, wherein the predetermined period of time is indicated as a value in a management information base (MIB) variable.

8. A method of wireless communication performed by a first non-access point (AP) multi-link device (MLD) that comprises first stations (STAs) that each comprise a transceiver configured to form a link with a corresponding AP of an AP MLD such that two of the links form a non-simultaneous transmit/receive (NSTR) link pair subject to NSTR constraints, the method comprising:
   generating a first message identifying a first link of the NSTR link pair as a target link for establishment of a peer-to-peer (P2P) direct link with a peer STA;
   transmitting the first message to the AP MLD over one of the links of the NSTR link pair; and
   waiting for a predetermined period of time after the first message is transmitted before performing uplink (UL) transmissions to the AP MLD over a second link of the NSTR link pair that is not the target link.

9. The method of claim 8, further comprising:
   receiving, over the first link of the NSTR link pair from the peer STA before the predetermined period of time has elapsed, a second message in response to the first message; and
   resuming UL transmissions over the second link of the NSTR link pair to the corresponding AP of the AP MLD after the second message is received.

10. The method of claim 9, wherein the first message is transmitted over the first link of the NSTR link pair.

11. The method of claim 9, wherein the first message is transmitted over the second link of the NSTR link pair.

12. The method of claim 9, further comprising:
   receiving, over the first link of the NSTR link pair from the peer STA before the predetermined period of time has elapsed, a second message in response to the first message; and
   transmitting, to the AP MLD, a notification message that indicates that the first non-AP MLD has received the second message.

13. The method of claim 8, further comprising terminating a P2P discovery process on the first link of the NSTR link pair after the predetermined period of time has elapsed.

14. The method of claim 8, wherein the predetermined period of time is indicated as a value in a management information base (MIB) variable.

15. An access point (AP) multi-link device (MLD), comprising:
- APs each comprising a transceiver configured to form a link with a corresponding first station (STA) of a first non-AP MLD; and
- a processor operably coupled to the APs,
- wherein the transceiver of one of the APs is further configured to form a link with a second STA,
- wherein two of the links formed with the first STAs of the first non-AP MLD form a non-simultaneous transmit/receive (NSTR) link pair subject to NSTR constraints,
- wherein the transceiver of one of the APs corresponding to one of the links of the NSTR link pair is further configured to receive a first message from the first non-AP MLD,
- wherein the processor is configured to determine that the first message identifies a first link of the NSTR link pair as a target link for establishment of a peer-to-peer (P2P) direct link with the second STA as a peer STA, and
- wherein the transceiver of another of the APs corresponding to a second link of the NSTR link pair that is not the target link is further configured to wait for a predetermined period of time after the first message is received before soliciting uplink (UL) transmissions from the non-AP MLD.

16. The AP MLD of claim 15, wherein the transceiver of the AP that forms the link with the second STA is further configured to transmit the first message to the second STA.

17. The AP MLD of claim 15, wherein:
- the transceiver of one of the APs is further configured to receive, from the first non-AP MLD before the predetermined period of time has elapsed, a second message that indicates that the first non-AP MLD has received, from the second STA, a response to the first message, and
- the transceiver of the AP corresponding to the second link of the NSTR link pair is further configured to resume soliciting UL transmissions from the non-AP MLD after the second message is received.

18. The AP MLD of claim 15, wherein the first message is received over the first link of the NSTR link pair.

19. The AP MLD of claim 15, wherein the first message is received over the second link of the NSTR link pair.

20. The AP MLD of claim 15, wherein the predetermined period of time is indicated as a value in a management information base (MIB) variable.

\* \* \* \* \*